(12) United States Patent
Grob et al.

(10) Patent No.: US 11,907,886 B2
(45) Date of Patent: Feb. 20, 2024

(54) MACHINE LEARNING FOR PRODUCT ASSORTMENT ANALYSIS

(71) Applicant: SAP SE, Walldorf (DE)

(72) Inventors: Oliver Grob, Illingen (DE); Jens Mansfeld, Saarbruecken (DE)

(73) Assignee: SAP SE, Walldorf (DE)

( * ) Notice: Subject to any disclaimer, the term of this patent is extended or adjusted under 35 U.S.C. 154(b) by 132 days.

(21) Appl. No.: 17/538,796

(22) Filed: Nov. 30, 2021

(65) Prior Publication Data
US 2023/0169442 A1 Jun. 1, 2023

(51) Int. Cl.
G06Q 10/08 (2023.01)
G06F 40/40 (2020.01)
G06T 15/00 (2011.01)
G06N 3/045 (2023.01)

(52) U.S. Cl.
CPC ............. *G06Q 10/08* (2013.01); *G06F 40/40* (2020.01); *G06N 3/045* (2023.01); *G06T 15/00* (2013.01)

(58) Field of Classification Search
CPC .......... G06N 3/08; G06N 20/00; G06N 3/045; G06N 5/01; G06F 16/26; G06F 17/16; G06F 16/953; G06F 16/285; G06F 40/40; G06F 3/0484; G06Q 10/087; G06Q 10/08; G06T 15/00; G06V 10/82; G06V 10/40
See application file for complete search history.

(56) References Cited

U.S. PATENT DOCUMENTS

| | | | |
|---|---|---|---|
| 10,528,907 B2 | 1/2020 | Pobbathi et al. | |
| 10,997,615 B1 | 5/2021 | Alvarez et al. | |
| 11,049,590 B1 * | 6/2021 | Lee | G06N 3/08 |
| 11,423,072 B1 * | 8/2022 | Chen | G06F 18/253 |
| 2013/0177235 A1 * | 7/2013 | Meier | G06T 19/003 |
| | | | 382/154 |

(Continued)

OTHER PUBLICATIONS

Gupta, Vivek, "Product Classification in E-Commerce using Distributional Semantics", arXiv:1606.06083v2, [Online]. Retrieved from the Internet: URL: https: arxiv.org pdf 1606.06083.pdf, (Jul. 25, 2016), 17 pgs.

(Continued)

*Primary Examiner* — Florian M Zeender
*Assistant Examiner* — Milena Racic
(74) *Attorney, Agent, or Firm* — SCHWEGMAN LUNDBERG & WOESSNER, P.A.

(57) ABSTRACT

In an example embodiment, a machine learning algorithm is used to train a machine-learned model to create a three-dimensional representation of products, with each product mapped into a coordinate in the three-dimensional space. The model selects the coordinates based on the similarity of the product to other products. Coordinates that are closer geometrically in the three-dimensional space represent products that are similar to each other, whereas as the coordinates get further and further away, this implies that the products are less and less similar. This machine-learned model then not only allows for quick analysis of multiple products, as similarity between products or groups of products can be performed using geometric calculations (e.g., cosine distance), but also can then be tied into a three-dimensional representation that can be displayed either on a two-dimensional display or displayed on a three-dimensional display.

17 Claims, 10 Drawing Sheets

(56) References Cited

U.S. PATENT DOCUMENTS

| | | |
|---|---|---|
| 2018/0365718 A1 | 12/2018 | Sprecher |
| 2021/0133670 A1* | 5/2021 | Cella .................. G06N 3/044 |
| 2021/0158420 A1 | 5/2021 | Canfield et al. |
| 2021/0166033 A1* | 6/2021 | McCanney ............ G06V 20/41 |
| 2021/0248446 A1 | 8/2021 | Hughes et al. |
| 2022/0188700 A1* | 6/2022 | Khavronin ......... G06Q 30/0201 |
| 2023/0169442 A1* | 6/2023 | Grob .................... G06N 3/08 |
| | | 705/28 |

OTHER PUBLICATIONS

Timonina-Farkas, Anna, "Product assortment and space allocation strategies to attract loyal and non-loyal customers", vol. 285, Issue3, [Online]. Retrieved from the Internet: URL: https: www.sciencedirect. com science article pii S0377221720301375, (2020), 1058-1076.

* cited by examiner

US 11,907,886 B2

MACHINE LEARNING FOR PRODUCT ASSORTMENT ANALYSIS

TECHNICAL FIELD

This document generally relates to machine learning. More specifically, this document relates to the use of machine learning to perform product assortment analysis.

BACKGROUND

Entities often need to make decisions about which products to offer. Large entities often have an individual in charge of selecting which products to offer at their various locations. These individuals are known as assortment managers. These assortment managers are often balancing a number of different factors in selecting which products to stock, including desirability of the products to consumers, space and logistics cost, similarity of products to other products, potential cannibalization from one product to another, and how much to favor their own brands.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Despite recent progress in automation of assortment selection, it is still difficult for assortment managers to perform analysis of all the potential products they could stock, especially for large retailers that might stock more than 100,000 different products. Ordinary machine learning techniques can fail to properly group the products into groupings of similar products, which causes challenges when performing the analysis. Rather, these techniques rely upon pre-existing classifications of products, which can create difficulty for products that may cross categories or reasonably be contained in more than one category (e.g., beer can be classified in a beverage category but also in a barbeque category). Often these categories are part of strict hierarchies, which may be too rigid to deal with products that may straddle the lines between categories. Additionally, visualizations related to the output of ordinary machine learning techniques often do not differ from those that did not use machine learning—results are often presented in tabular format that can make large-scale visualizations and comparisons difficult. These techniques do not tie the visualization to the actual way the machine-learned model is designed but rather take only the output of the machine-learned model and treat it the same as data from any other source.

In an example embodiment, a machine learning algorithm is used to train a machine-learned model to create a three-dimensional representation of products, with each product mapped into a coordinate in the three-dimensional space. The model selects the coordinates based on the similarity of the product to other products. Coordinates that are closer geometrically in the three-dimensional space represent products that are similar to each other, whereas as the coordinates get further and further away, this implies that the products are less and less similar. This machine-learned model then not only allows for quick analysis of multiple products, as similarity between products or groups of products can be performed using geometric calculations (e.g., cosine distance), but also can then be tied into a three-dimensional representation that can be displayed either on a two dimensional display such as a laptop, desktop, or mobile computing display, or displayed on a three dimensional display such as virtual reality headset. Additional features can then be provided in the three-dimensional visualization to enhance functionality.

Figure 1:
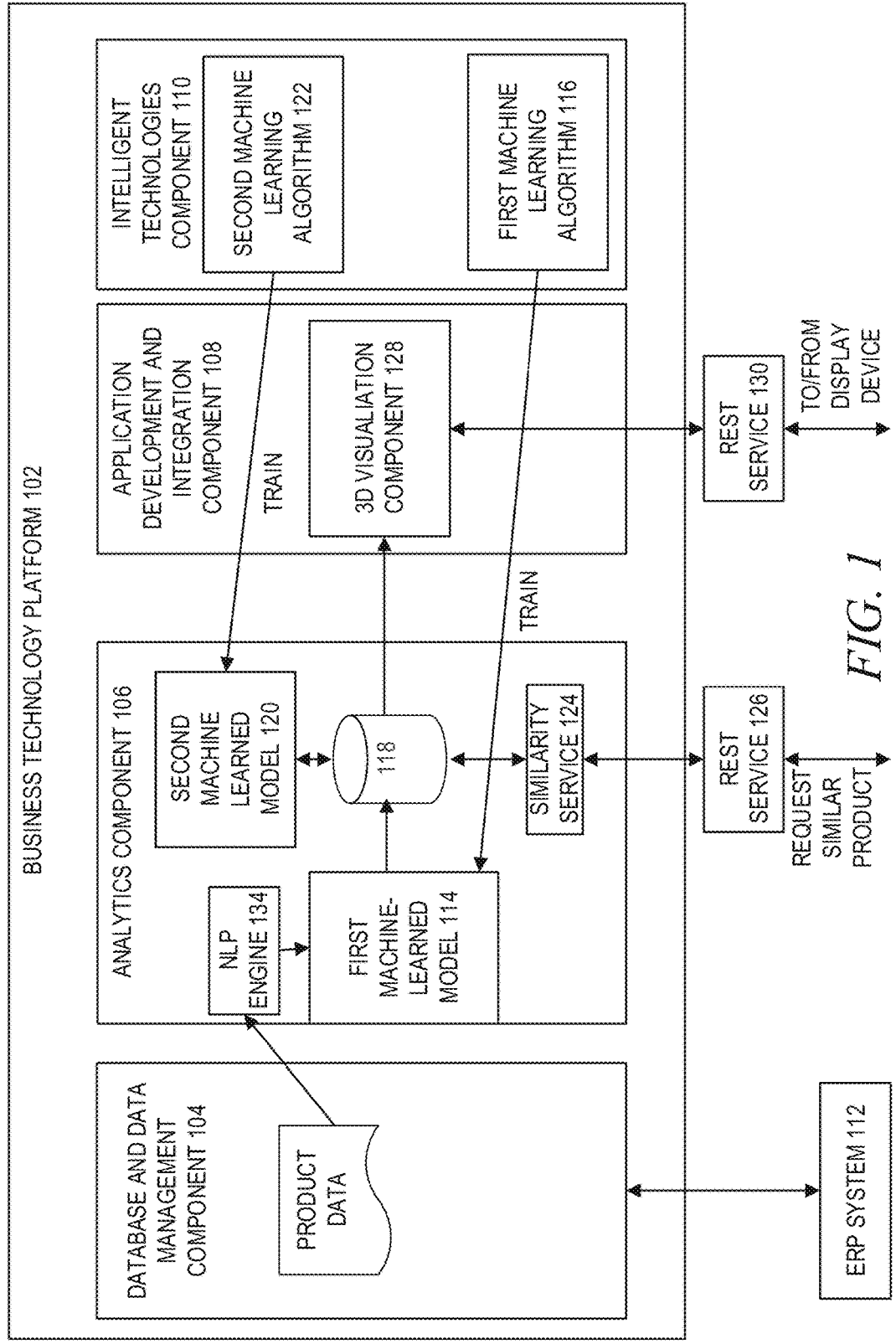
FIG. 1 is a block diagram illustrating a system for performing training of a machine-learned model, in accordance with an example embodiment.

FIG. 1 is a block diagram illustrating a system 100 for performing training of a machine-learned model, in accordance with an example embodiment. The system 100 may include a business technology platform 102 that includes a database and data management component 104, an analytics component 106, an application development and integration component 108, and an intelligent technologies component 110. The database and data management component 104 acts to maintain and manage master data, such as by managing data stored in an Enterprise Resource Planning (ERP) system 112. The ERP system 112 maintains large amounts of master data, which is data about business entities that provide context for business transactions. The most commonly found categories of master data are parties, products, financial structures, and locational concepts. Master data is distinguished from reference data. While both master data and reference data provide context for business transactions, reference data is concerned with classifications and categorization, while master data is concerned with business entities. Notably, while master data may provide useful context for business transactions, it is not itself business transaction data. In the present disclosure, the master data of interest relates to products.

The analytics component 106 provides resources to users to analyze data. With respect to the present disclosure, the analytics component 106 includes a first machine-learned model 114. The first machine-learned model 114 may be trained using a first machine learning algorithm 116 located in the intelligent technologies component 110. More particularly, the first machine learning algorithm 116 trains the first machine-learned model 114 to take master data relating to products and turn it into multidimensional vectors. Each vector contains a plurality of dimensions, with each dimension related to a different feature of the data, pertaining to a single product. A feature represents a particular type field of data. Since the data here pertains to products, each feature is a different attribute of a product, with values for each feature representing the values for the attributes. The first machine learning algorithm 116 is further trained to map each vector to a coordinate in three-dimensional space, with the coordinate being indicative of similarity to other vectors mapped to coordinates in the three-dimensional space. Master data pertaining to products may then be fed to the trained first machine-learned model 114, which may generate a set of three-dimensional coordinates corresponding to each product. These three-dimensional coordinates may be stored in a data structure 118. In an example embodiment, each instance of master data may have its own data structure 118, roughly corresponding to each retailer. However, in some example embodiments, there may be more than one data structure for a retailer (e.g., a different data structure for each division of a retailer, or a different data structure for each assortment manager), or one data structure for multiple retailers.

A second machine-learned model 120 may be trained by a second machine learning algorithm 122 to cluster the coordinates into one or more clusters. Each cluster represents a different category of products, although rather than the strict hierarchy of products assigned to products by humans, these categories are learned based on the similarity of products as determined by the first machine-learned model, and thus are more accurate in actually identifying groupings of similar products, without regard for hierarchical categorization. In an example embodiment, the second machine-learned model may perform ABC analysis of the products based on the data structure 118. In another example embodiment, the second machine-learned model 120 may utilize a clustering algorithm, such as k-nearest neighbor.

A similarity service 124 may expose an interface, via a Representational State Transfer (REST) service 126, for a user or service to request identification of one or more products similar to a specified product. For example, a user may specify a product that has been discontinued by its manufacturer, and the similarity service 124 may then query the data structure 118 to determine one or more products similar to the discontinued product. This may be performed by the similarity service 124 identifying the set of coordinates associated with the discontinued product and then locating one or more sets of coordinates within some threshold geometric distance to the discontinued product in the three-dimensional space, as specified by the data structure 118. Those sets of coordinates within the threshold geometric distance then represent "matching" products for the discontinued product, which allows the assortment manager to then order one or more of those matching products to make up for the loss of the discontinued product. In some example embodiments, the user or service need not even specify a particular real product to identify similar matches to, but may instead specify a hypothetical or "dream" product to have the similarity service 124 identify close matches to. In this way, the similarity service 124 may act as a recommendation service. A questionnaire may be presented to users that allow the users to identify features of such a hypothetical or "dream" product.

A three-dimensional visualization component 128 may then generate a three-dimensional visualization of the three-dimensional space found in the data structure 118. This three-dimensional visualization may be displayed within a user interface, which may be surfaced to users via REST service 130. As mentioned briefly earlier, this three-dimensional visualization may either be rendered on a two-dimensional display or may be rendered to an augmented reality or other three-dimensional display. The three-dimensional visualization may display each product as a dot at the set of coordinates corresponding to the product in a three-dimensional grid or graph. As will be described in more detail later, additional functionality may be embedded within this three-dimensional visualization, allowing users to see a fourth dimension of data, as well as menu functions allowing the users to interact with the system 100 to perform various actions on the underlying product data.

In an example embodiment, the first machine learning algorithm 116 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

In one example embodiment, the first machine learning algorithm 116 may be a recurrent neural network (RNN), using technology such as Long Short-Term Memory (LSTM) and/or gated recurrent units (GRUs). The RNN can be fed vectors representing the different features and be trained to generate embedding based on those features. The embeddings form the parameters (weights) of the network, which are adjusted to minimize loss on a task. The resulting embedded vectors are representations of categories where similar categories—relative to the task—are closer to one another.

In an example embodiment, the deep neural network is a LSTM network. An LSTM network is a special type of RNN. RNNs have loops in them, allowing information to persist. Specifically, information from an RNN is sent back to itself, so that over time the RNN is actually learning from itself. One of the appeals of RNNs is that they may be able to connect previous information to a present task. However, they can have trouble in making predictions based on non-recent information. For example, an RNN trained to predict the meaning of a last word in a long sentence may be able to accurately make that prediction based on the prior few words in the long sentence, but it may not perform well if the key to understanding the last word in the long sentence was the first word in the long sentence. As the gaps between words grows, RNNs become less able to connect the information.

In an example embodiment, an LSTM network is used to avoid this long-term dependency problem. An LTSM has four separate neural network layers interacting in a special way. The first layer is a sigmoid layer that decides which information to discard from the cell state. This layer decides what information to forget, such as forgetting the gender of a subject when a new subject is encountered in a sentence. The second layer is a sigmoid layer that decides which values to save in the cell. The third layer then actually updates the new cell state based on the decisions from the first and second layers. The fourth layer is another sigmoid layer that decides what will be output.

The first machine-learned model 114 may then translate the high-dimensionality vectors into a low-dimensional space, here a three-dimensional space. Autoencoders can be used to take embedding vectors as both the input and the target and use successive layers to decrease the size of the embedding down to a smaller encoded state and then back up to its original dimensions.

It should also be noted that the first machine-learned model 114 may be periodically retrained, by submitting new sample data into the first machine learning algorithm 116, or by using other forms of feedback, such as user feedback about the accuracy of the embeddings, to adjust the learned embeddings. As such, an embedding for a product may not be fixed, even if the product attributes do not change, as the embedding parameters can cause a change to the embedding for a product if the embedding parameters are updated during retraining.

The above description assumes that the master data contains data for all dimensions that the first machine learning algorithm might find relevant to determining similarity of products. That, however, may not always be the case. This technical issue may be solved in a number of different ways. In a first example embodiment, a data aggregator (not pictured) could retrieve product data from sources other than the master data, such as from web sites. For example, the data aggregator 132 could take product information from the master data and use that product information to perform online searches for additional data about the product. The data aggregator may, in conjunction with or in lieu of the external data, can retrieve additional dimension information from the master data, even though that data is not labeled as dimension data in the master data. For example, master data may include textual descriptions of the products, and these textual descriptions may be mined for additional features of the product not identified as distinct features in the metadata. For example, in the case of wine, this textual data may describe the wine's aroma (e.g., "oaky"), while aroma itself is not a separate column in the master data and thus would not at first glance appear to be its own dimension. Thus the data aggregator may essentially retrieve this additional information from the master data and create columns for it, making it dimensional data even though it was not originally in the master data. As part of this process, or the process of retrieving the additional information from external sources, natural language processing may be used to convert textual data to data that has meaning within the system 100.

A Natural Language Processing (NLP) engine 134 applies one or more NLP rules to the input sentence, filters sentence words into grammatical entities, and produces structured sentence objects. More particularly, the NLP engine 134 determines a grammatical type (e.g., noun, verb, etc.) for each word and the dependencies between each word. Each dependency is indicative of the grammatical relationship between words, such as whether one of words is a direct object of the other word, punctuation for another word, adverbial clause modifier (advcl) for the other word, and so forth.

NLP processing may include general filtering actions such as removing unwanted words and characters from the text. This may include removing unnecessary spaces; removing standard punctuations such as !"#$%&'( )+,-./:;<=>?@[\]^_`{|}~; keeping only characters containing the letters a-z and the numbers 0-9; normalizing case (such as by converting everything to lowercase); removing stop words such as 'i', 'me', 'my', 'myself', 'we', 'our', 'ours', 'ourselves', 'you', 'your', 'yours', 'yourself', 'yourselves', 'he', 'him', 'his', etc.; removing greeting words such as 'hi', 'hello', 'regards', 'kind', 'regards', etc.'; and the replacing of some words with regular expressions. Additionally, stemming and lemmatization of words may be performed. Stemming and lemmatization are text normalization techniques. Stemming is the process of reducing inflection in words to their root forms, such as mapping a group of words to the same stem even if the stem itself is not a valid word in the language. Thus, stemming a word involves removing prefixes and suffixes. Lemmatization, on the other hand, reduces the inflected words to a root form that is part of the language. This root word is called a lemma. Lemmatization involves identifying a canonical version of a word, and the canonical version may involve more or less than merely removing suffixes and prefixes. For example, ran, run, and running may be lemmatized to the canonical word "run," even though changing ran to run does not involve adding or removing suffixes.

In an example embodiment, a Token-to-Vector (Tok2Vec) algorithm is used in the NLP engine 134 to perform the NLP aspects. The Tok2Vec algorithm may include two subnetworks. The first is a subnetwork for embedding, which embeds tokens into context-independent word vector representations. The word vector representations are called embeddings and are coordinates in an n-dimensional space that represent the corresponding token that has been embedded. The assignment of coordinates is based on an embedding model, which is its own machine learned model trained to assign similar coordinates to similar tokens (and dissimilar coordinates to dissimilar tokens), such that the geometric (e.g., cosine) distance between two coordinate sets represents how similar or different the corresponding tokens are. The second subnetwork is for encoding and may utilize a convolutional neural network, Bidirectional Long Short-Term Memory (BiLSTM), or the like.

Figure 2:
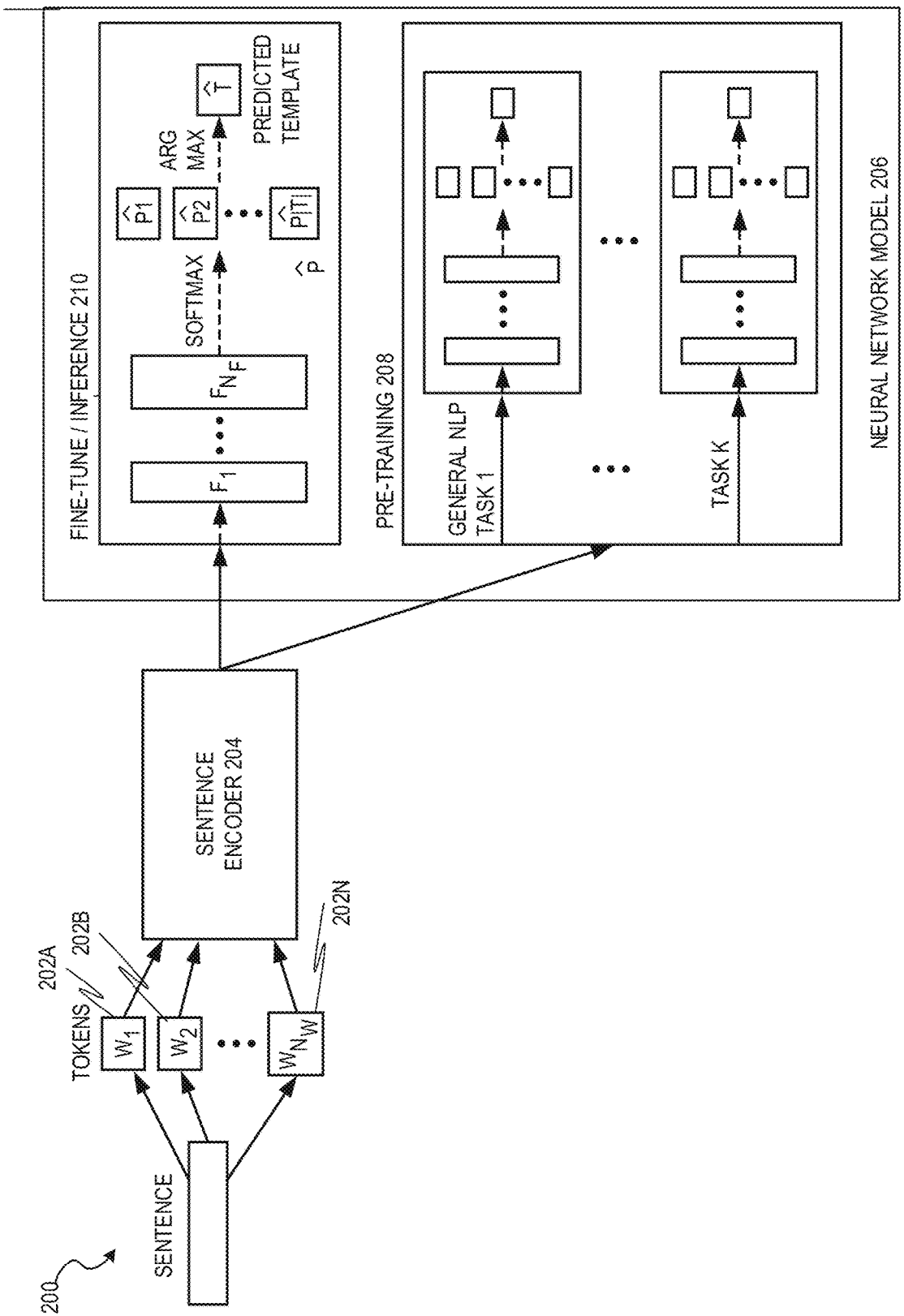
FIG. 2 is a block diagram illustrating a deep neural network, in accordance with an example embodiment.

In one example embodiment, the NLP engine 134 implements a deep neural network having a sentence encoder, with the neural network programmed with a loss function. FIG. 2 is a block diagram illustrating a deep neural network 200, in accordance with an example embodiment. Each sentence is split into a series of tokens 202A-202N and the tokens 202A-202N are passed to a sentence encoder 204, which utilizes a neural network model 206. In an example embodiment, the sentence encoder 204 is first pre-trained 208 with general tasks, and then the sentence encoder 204 is fine-tuned 210 with a multilayer perceptron network (MLP) using the template classification data.

The MLP learns how to parse a sentence and assign an embedding to the sentence based on the parsing. The embedding identifies a set of coordinates (called a vector) in a multidimensional space to each parsed sentence. One or more similarity measures between coordinates may then be used to identify the similarity between corresponding sentences. One example metric is cosine similarity. In cosine similarity, the cosine of the angle between two vectors is computed. The cosine similarity of two sentences will range from 0 to 1. If the cosine similarity is 1, it means the two vectors have the same orientation and thus are identical. Values closer to 0 indicate less similarity. Other measures of similarity may be used, in lieu of or in addition to the cosine similarity, such as Euclidean distance and Jaccard similarity. Additionally, these baseline metrics can be improved by methods such as ignoring stopwords and computing averages weighted by term frequency-inverse document frequency (TF-IDF). Alternatively, techniques such as Word Mover's Distance (WMD) and Smooth Inverse Frequency (SIF) can also be employed.

Figure 3:
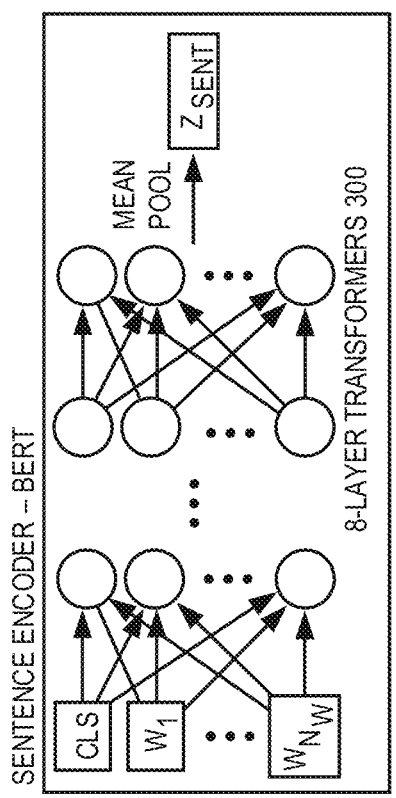
FIG. 3 is a block diagram illustrating BERT, in accordance with an example embodiment.

In an example embodiment, BERT are used to encode sentences into embeddings in the sentence encoder 204. It should be noted that BERT is merely used in some example embodiments, and in others another language model can be used in lieu of BERT. FIG. 3 is a block diagram illustrating BERT, in accordance with an example embodiment. BERT uses transformer layer(s) 300 to encode the input sentence to embedding. Each transformer layer is defined as follows:

$$TFLayer(h^{n-1}) = FC(MultiAttn(h^{n-1}));$$

$$FC(x) = relu(xW_1 + b_1)W_2 + b_2;$$

$$MultiAttn(h^{n-1}) = \text{concat}(\text{head}_1(h^{n-1}), \ldots, \text{head}_k(h^{n-1}))W^O,$$

$$\text{head}_i(h^{n-1}) = \text{softmax}\left(\frac{(h^{n-1}W_q^i)(h^{n-1}W_k^i)}{\sqrt{d_k}}\right)(h^{n-1}W_v^i).$$

where $h^{n-1}$ is the output of the previous transformer layer. Here, a BERT model with 8 transformer layers is used, and the output sentence embedding $z_{sent}$ is defined as the mean-pooling result of the last transformer layer's output. For simplicity, batch normalization and residual connections are omitted in the equations.

It should be noted that the NLP engine 134 may either be its own separately trained and run machine-learned model or may be integrated within the first machine-learned model.

Figure 4:
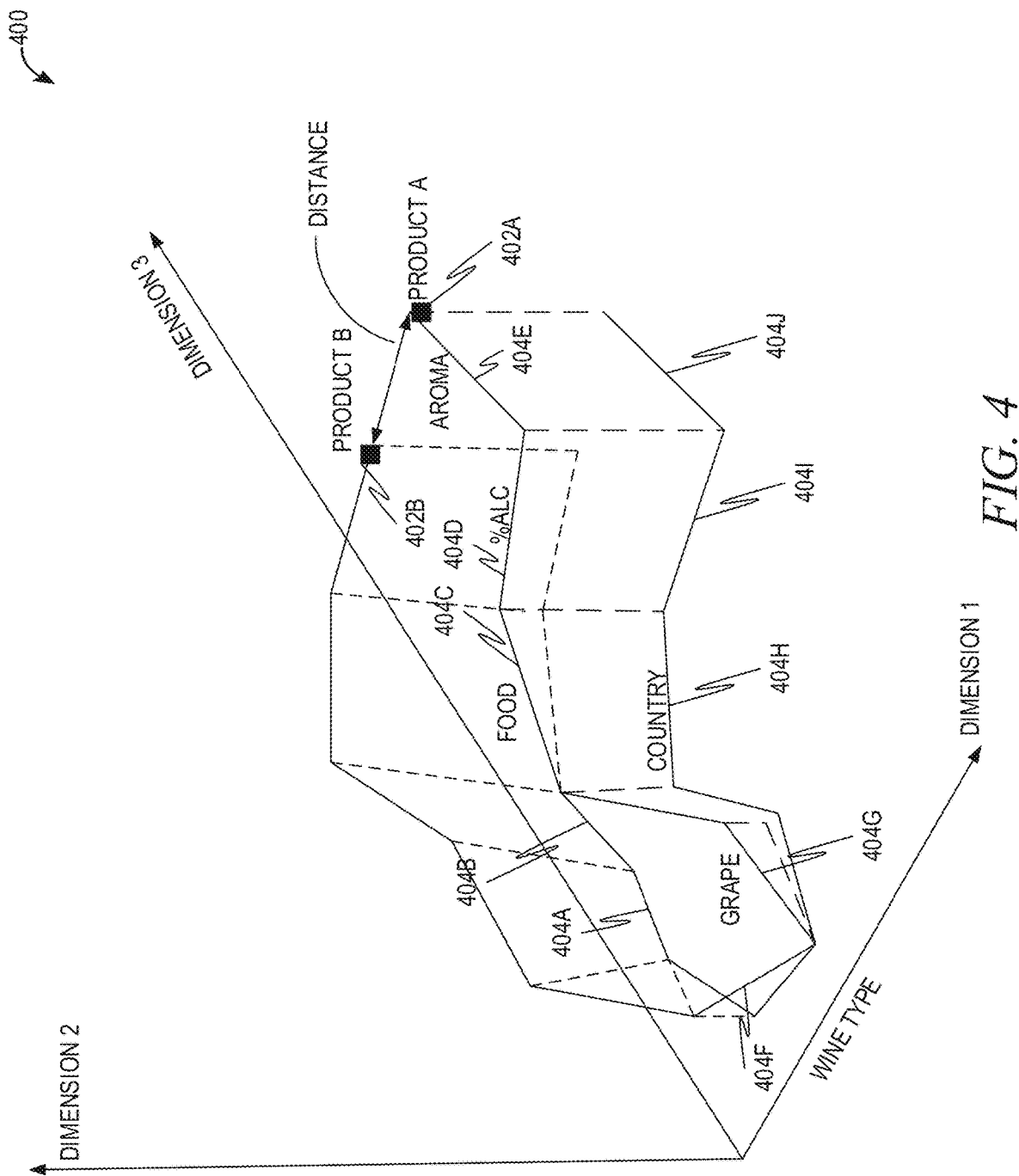
FIG. 4 is a diagram illustrating a data structure, in accordance with an example embodiment.

FIG. 4 is a diagram illustrating a data structure, in accordance with an example embodiment. Here, for each attribute, a fixed distance is added into an assigned dimension. Since there are more attributes than dimensions (three), the system needs to assign vectors to the attributes. Each attribute is used to move the vector into the three-dimensional latent space 400. In the end, a specific point 402A, 402B, is reached for each product, which is the sum of all attribute vectors. Thus, for example, here the point 402A for product A is the sum of attribute vectors 404A-404J.

Figure 5:
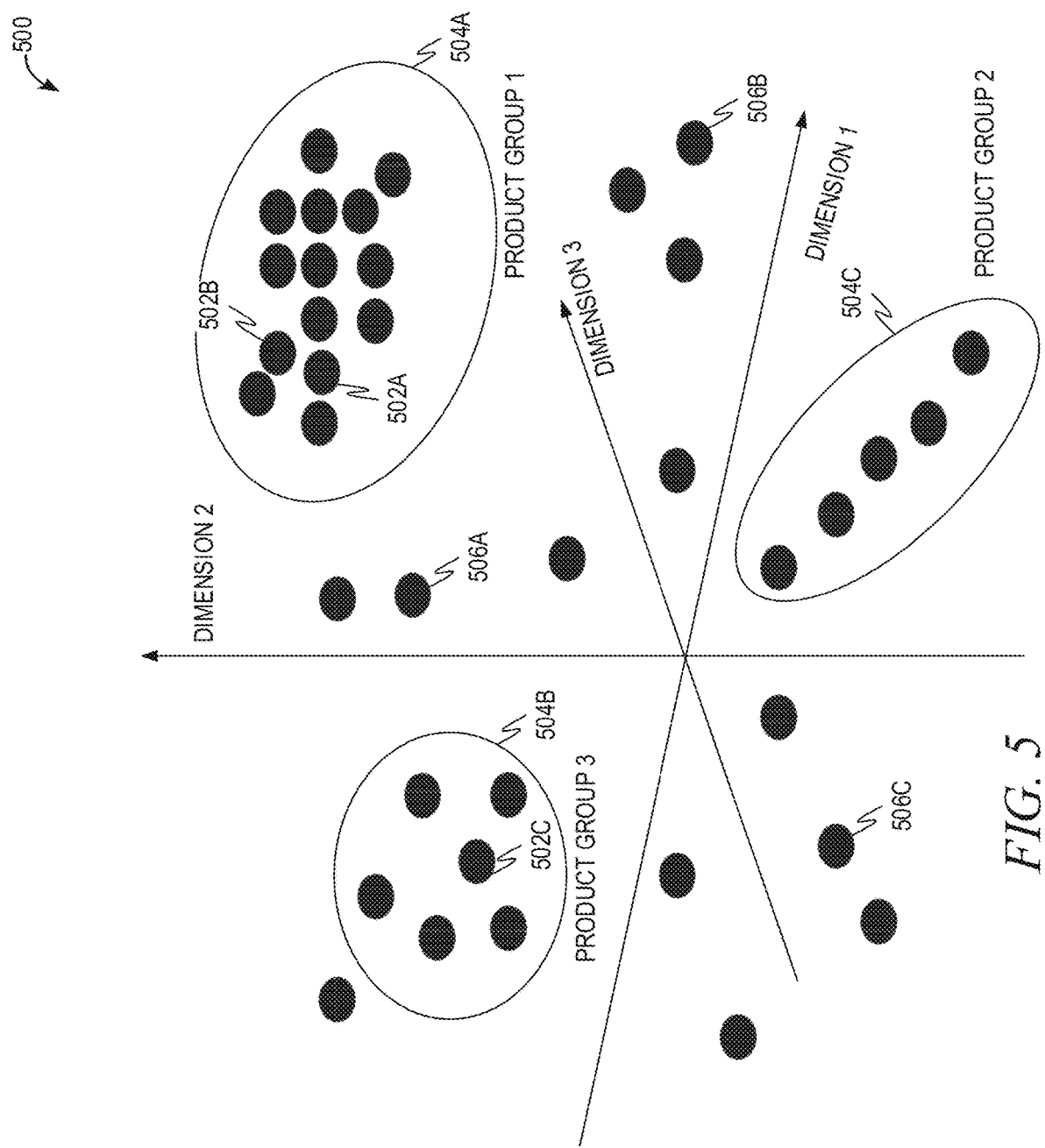
FIG. 5 is a screen shot of an example visualization of groupings of products, in accordance with an example embodiment.

FIG. 5 is a screen shot of an example visualization 500 of groupings of products, in accordance with an example embodiment. This visualization 500 may be produced by the three-dimensional visualization component 128. Here, each point, such as points 502A, 502B, 502C represent a different product. Additionally, product groups, such as groups 504A, 504B, 504C may be highlighted, indicating clusters of products who are similar enough that the clustering algorithm has grouped them together. There are also some outlier points, such as points 506A, 506B, and 506C, which are indicative of unique products that do not have many characteristics in common with other products, and thus are not clustered into a product group by the clustering algorithm.

Figure 6:
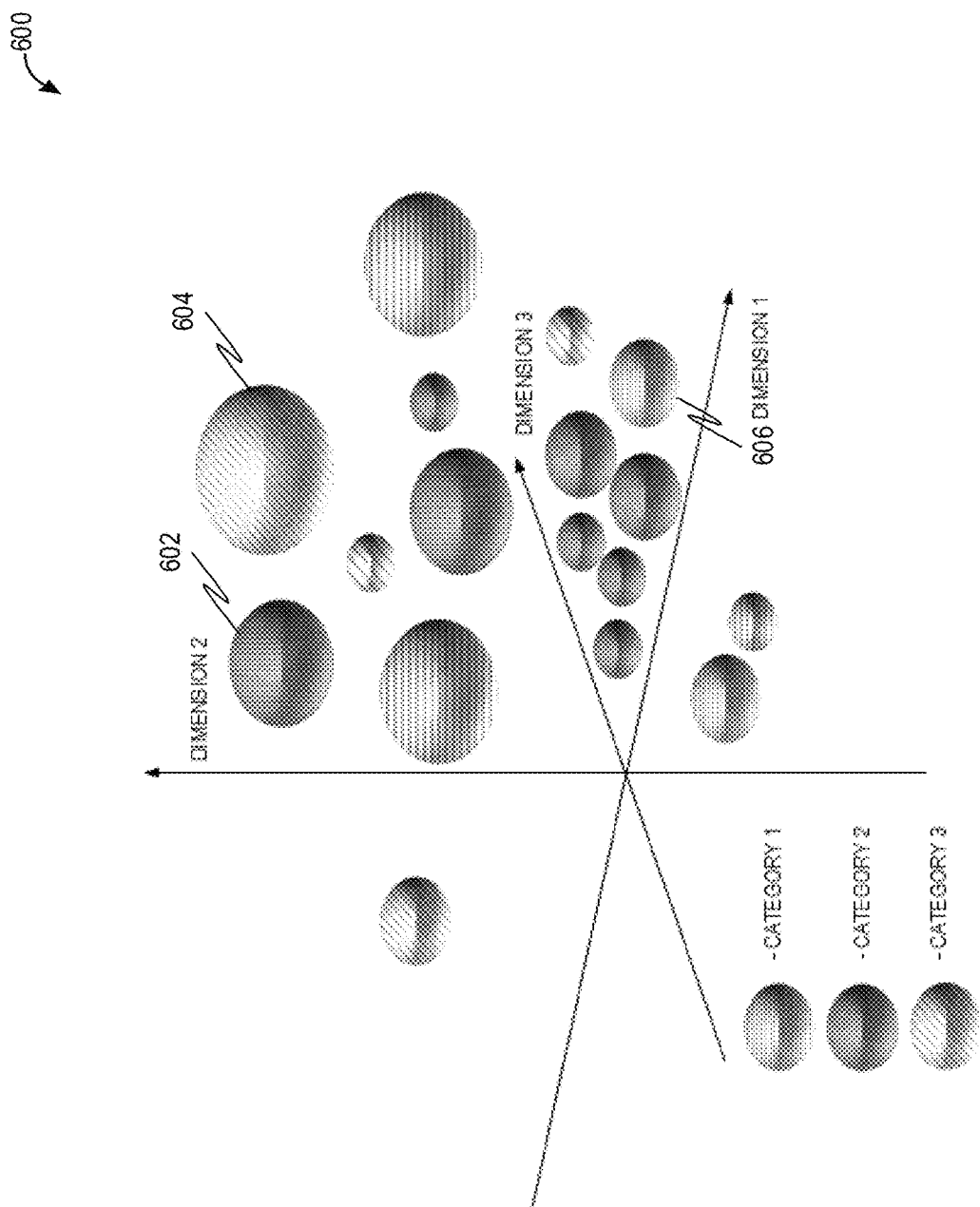
FIG. 6 is a screen shot of an example visualization of products, in accordance with another example embodiment.

FIG. 6 is a screen shot of an example visualization 600 of products, in accordance with another example embodiment. Here, rather than highlight the groupings themselves, a category for each product is depicted using a different color or shading. Additionally, another dimension may be depicted using the size of the point. Here, for example, that additional dimension is a key performance index, such as revenue. The points, such as points 602, 604, 606 resemble bubbles, and the larger the bubble, the more revenue for the product.

Figure 7:
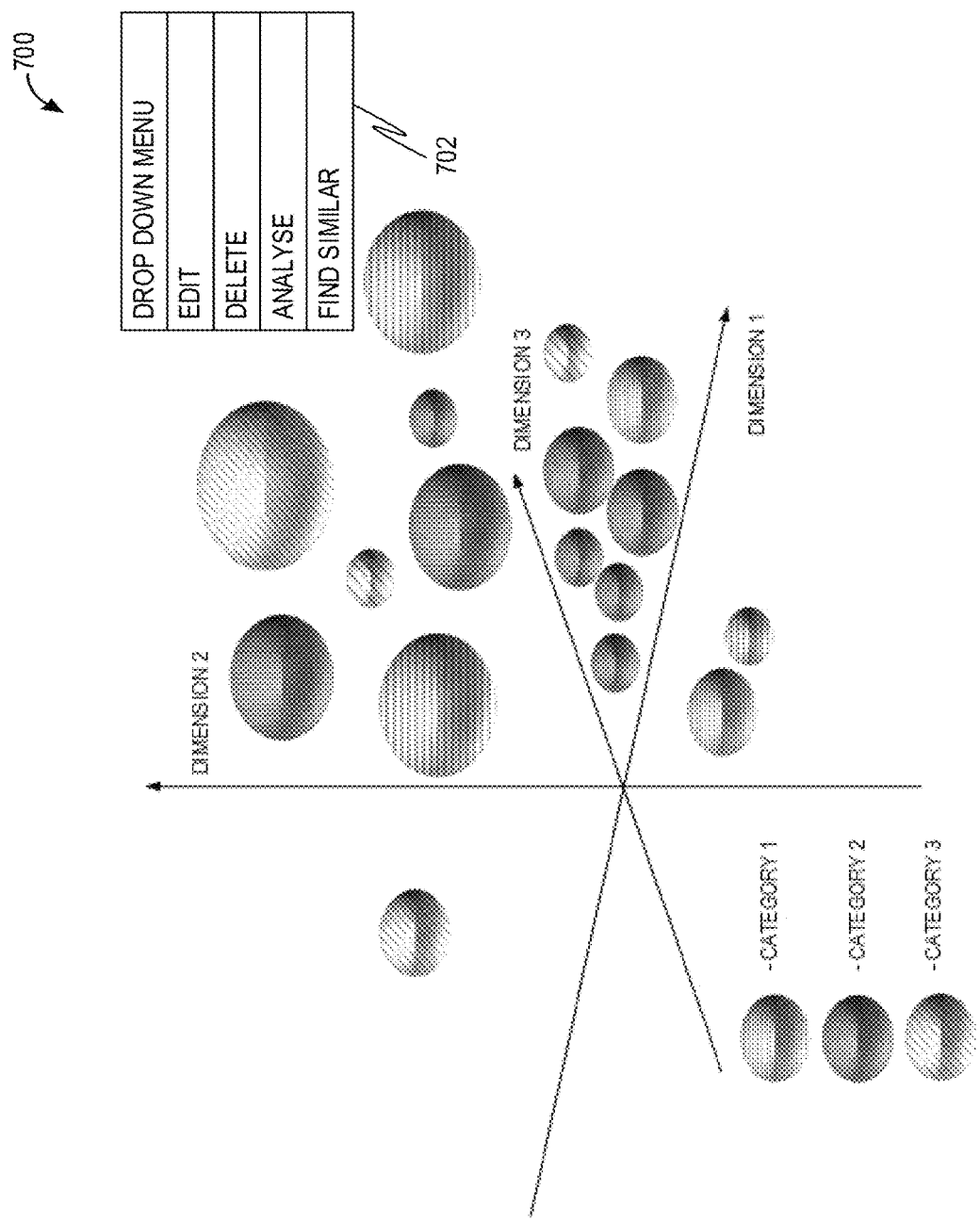
FIG. 7 is a screen shot of an example visualization of products, in accordance with another example embodiment.

FIG. 7 is a screen shot of an example visualization 700 of products, in accordance with another example embodiment. This example is similar to that of FIG. 6, although here a user is able to select on a particular point, such as point 602, and a drop down menu 702 is displayed showing additional functions the user can select related to the point 602. Here, for example, the user can select to edit the product, delete the product, analyze the product (such as by displaying additional Key Performance Indices (KPIs), such as margin), or find similar products.

Figure 8:
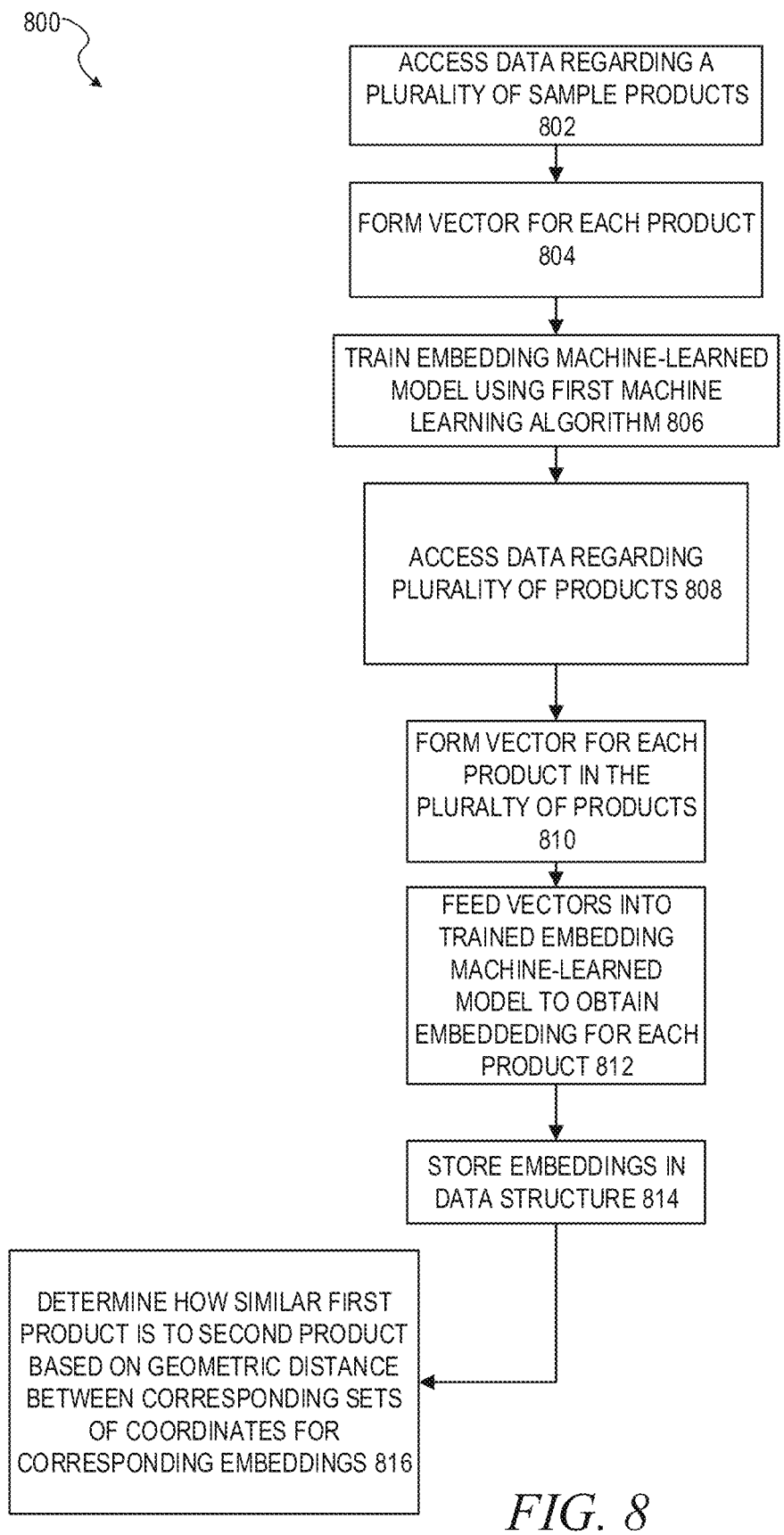
FIG. 8 is a flow diagram illustrating a method, in accordance with an example embodiment.

FIG. 8 is a flow diagram illustrating a method 800, in accordance with an example embodiment. First, at training time, at operation 802, data regarding a plurality of sample products is accessed. The data includes four or more attribute types and, for each product in the plurality of sample products, a value for each of the four or more attribute types. At operation 804, a vector is formed for each product in the plurality of sample products. The vector is an array comprising the values for each of the four or more attribute types. At operation 806, an embedding machine-learned model is trained using a first machine learning algorithm. The training comprises feeding the vectors for the plurality of sample products into the first machine learning algorithm, and the first machine learning algorithm, in response to the feeding, learning an embedding in a three dimensional space for each vector, with the embedding representing a set of parameters to apply to an input vector in order to map the input vector to a set of coordinates in the three dimensional space.

Later, at evaluation time, at operation 808, data regarding a plurality of products is accessed. The data regarding the plurality of products includes the four or more attribute types and, for each product in the plurality of products, a value for each of the four or more attribute types. At operation 810, a vector is formed for each product in the plurality of products. At operation 812, the vectors for the plurality of products are fed into the trained embedding machine-learned model to obtain an embedding for each product in the plurality of products. Then, at operation 814, the embedding for each product are stored in a data structure.

At operation 816, it is determined how similar a first product in the plurality of products is to a second product in the plurality of products based on a geometric distance between the set of coordinates corresponding to the embedding for the first product and the set of coordinates corresponding to the embedding for the second product, as stored in the data structure.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:

at least one hardware processor; and a non-transitory computer-readable medium storing instructions that, when executed by the at least one hardware processor, cause the at least one hardware processor to perform operations comprising:

accessing data regarding a plurality of sample products, the data including four or more attribute types and, for each product in the plurality of sample products, a value for each of the four or more attribute types;

forming a vector for each product in the plurality of sample products, the vector being an array comprising the values for each of the four or more attribute types; and training an embedding machine-learned model using a first machine learning algorithm, the training comprising feeding the vectors for the plurality of sample products into the first machine learning algorithm, the first machine learning algorithm, in response to the feeding, learning an embedding in a three dimensional space for each vector, the embedding representing a set of parameters to apply to an input vector in order to map the input vector to a set of coordinates in the three dimensional space.

Example 2. The system of Example 1, wherein the first machine learning algorithm is a recurrent neural network (RNN).

Example 3. The system of Example 2, wherein the RNN uses Long Short-Term Memories (LSTMs).

Example 4. The system of any of Examples 1-3, wherein the operations further comprise:
  accessing data regarding a plurality of products, the data regarding the plurality of products including the four or more attribute types and, for each product in the plurality of products, a value for each of the four or more attribute types;
  forming a vector for each product in the plurality of products, the vector being an array comprising the values for each of the four or more attribute types; and
  feeding the vectors for the plurality of products into the trained embedding machine-learned model to obtain an embedding for each product in the plurality of products; and
  storing the embedding for each product in a data structure.

Example 5. The system of Example 4, wherein the data structure is a graph.

Example 6. The system of Examples 4 or 5, wherein the operations further comprise determining how similar a first product in the plurality of products is to a second product in the plurality of products based on a geometric distance between the set of coordinates corresponding to the embedding for the first product and the set of coordinates corresponding to the embedding for the second product, as stored in the data structure.

Example 7. The system of any of Examples 4-6, wherein the operations further comprise performing a clustering algorithm on the embeddings in the data structure to identify groups of similar products.

Example 8. The system of any of Examples 4-7, wherein the operations further comprise:
  rendering a graphical user interface displaying a three-dimensional graph, with the embeddings in the data structure displayed as points in the three-dimensional graph corresponding to their respective set of coordinates.

Example 9. The system of Example 8, wherein a category for each product in the plurality of products is indicated in the graphical user interface as a color or shading for each point.

Example 10. The system of Example 8 or 9, wherein a value for a key performance index (KPI) for each product is indicated in the graphical user interface as a size of the corresponding point.

Example 11. The system of any of Examples 1-10, wherein the data is obtained from master data.

Example 12. The system of Example 11, wherein a portion of the data is structured as attributes in the master data while another portion of the data is unstructured text; and wherein the operations further comprise using a second machine-learned model to perform natural language processing on the unstructured text to convert it to structured text.

Example 13. A method comprising:
  accessing data regarding a plurality of sample products, the data including four or more attribute types and, for each product in the plurality of sample products, a value for each of the four or more attribute types;
  forming a vector for each product in the plurality of sample products, the vector being an array comprising the values for each of the four or more attribute types; and
  training an embedding machine-learned model using a first machine learning algorithm, the training comprising feeding the vectors for the plurality of sample products into the first machine learning algorithm, the first machine learning algorithm, in response to the feeding, learning an embedding in a three dimensional space for each vector, the embedding representing a set of parameters to apply to an input vector in order to map the input vector to a set of coordinates in the three dimensional space.

Example 14. The method of Example 13, wherein the first machine learning algorithm is a recurrent neural network (RNN).

Example 15. The method of Example 14, wherein the RNN uses Long Short-Term Memories (LSTMs).

Example 16. The method of Example 13, further comprising:
  accessing data regarding a plurality of products, the data regarding the plurality of products including the four or more attribute types and, for each product in the plurality of products, a value for each of the four or more attribute types;
  forming a vector for each product in the plurality of products, the vector being an array comprising the values for each of the four or more attribute types; and
  feeding the vectors for the plurality of products into the trained embedding machine-learned model to obtain an embedding for each product in the plurality of products; and
  storing the embedding for each product in a data structure.

Example 17. The method of Example 16, wherein the data structure is a graph.

Example 18. The method of Examples 16 or 17, further comprising determining how similar a first product in the plurality of products is to a second product in the plurality of products based on a geometric distance between the set of coordinates corresponding to the embedding for the first product and the set of coordinates corresponding to the embedding for the second product, as stored in the data structure.

Example 19. A non-transitory machine-readable medium storing instructions which, when executed by one or more processors, cause the one or more processors to perform operations comprising:
  accessing data regarding a plurality of sample products, the data including four or more attribute types and, for each product in the plurality of sample products, a value for each of the four or more attribute types;
  forming a vector for each product in the plurality of sample products, the vector being an array comprising the values for each of the four or more attribute types; and
  training an embedding machine-learned model using a first machine learning algorithm, the training comprising feeding the vectors for the plurality of sample products into the first machine learning algorithm, the first machine learning algorithm, in response to the feeding, learning an embedding in a three dimensional space for each vector, the embedding representing a set of parameters to apply to an input vector in order to map the input vector to a set of coordinates in the three dimensional space.

Example 20. The non-transitory machine-readable medium of Example 19, wherein the first machine learning algorithm is a recurrent neural network (RNN).

Figure 9:
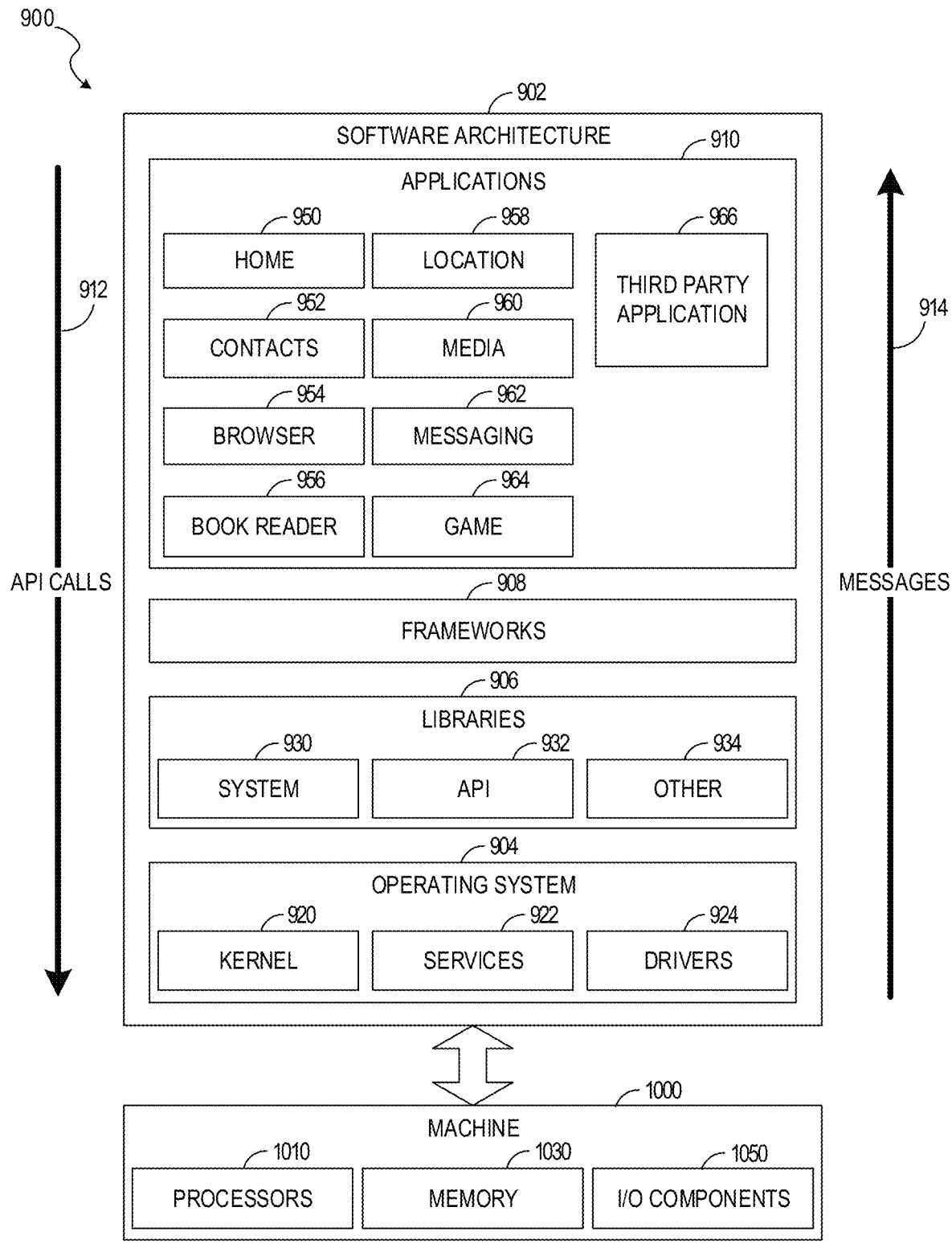
FIG. 9 is a block diagram illustrating an architecture of software, which can be installed on any one or more of the devices described above.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional and three-dimensional in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
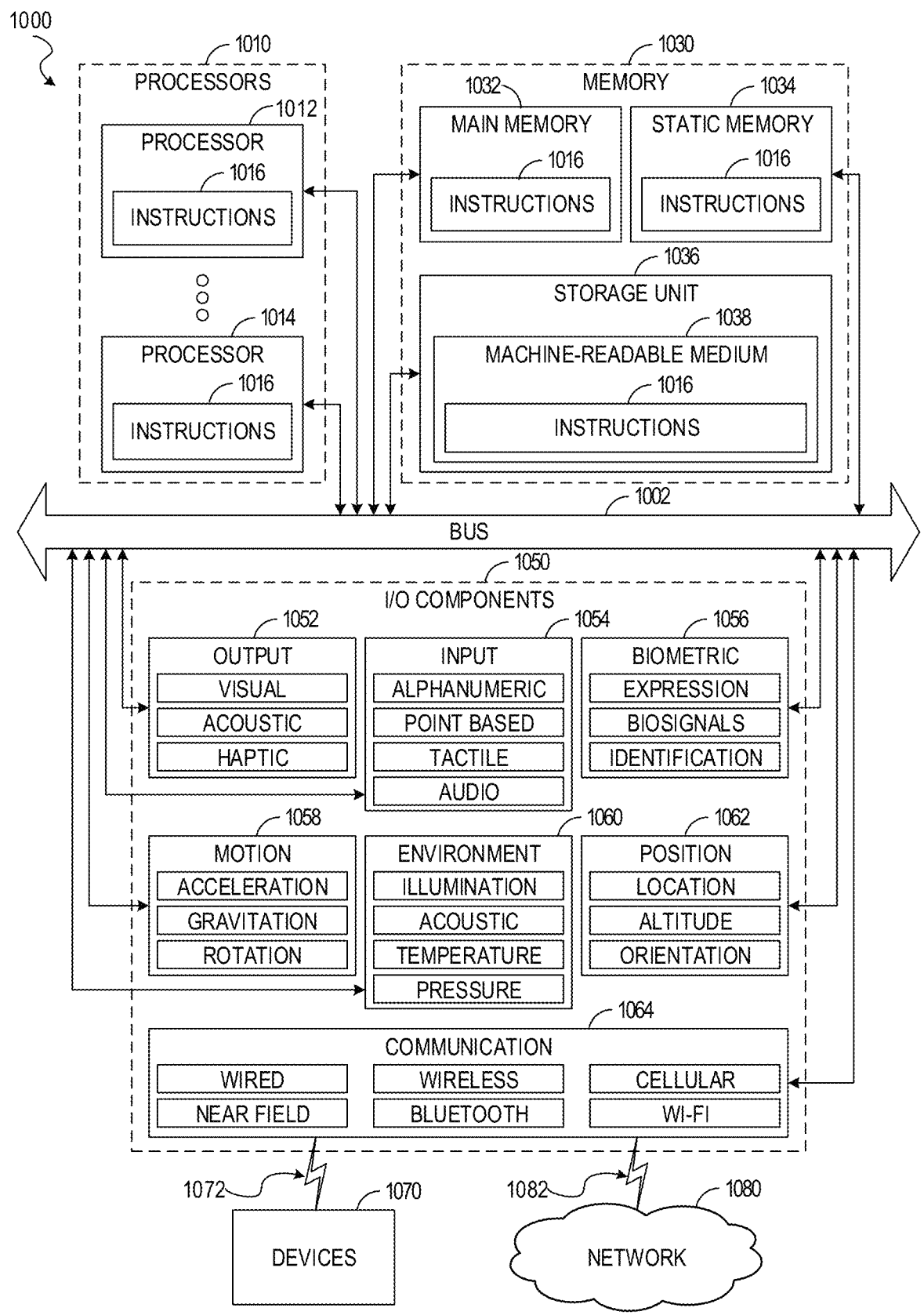
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the methods of FIG. 8. Additionally, or alternatively, the instructions 1016 may implement FIGS. 1-8 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   accessing data regarding a plurality of sample products, the data including four or more attribute types and, for each product in the plurality of sample products, a value for each of the four or more attribute types;
   forming a vector for each product in the plurality of sample products, the vector being an array comprising the values for each of the four or more attribute types;
   training an embedding machine-learned model using a first machine learning algorithm to produce a trained embedding machine-learned model, the training comprising feeding the vectors for the plurality of sample products into the first machine learning algorithm, the first machine learning algorithm, in response to the feeding, learning an embedding in a three dimensional space for each vector, the embedding representing a set of parameters to apply to an input vector in order to map the input vector to a set of coordinates in the three dimensional space;
   accessing data regarding a plurality of products, the data regarding the plurality of products including the four or more attribute types and, for each product in the plurality of products, a value for each of the four or more attribute types;
   forming a vector for each product in the plurality of products, the vector being an array comprising the values for each of the four or more attribute types; and
   feeding the vectors for the plurality of products into the trained embedding machine-learned model to obtain an embedding for each product in the plurality of products; and
   storing the embedding for each product in a data structure; and rendering a graphical user interface displaying a three-dimensional graph, with the embeddings for each product in the plurality of products in the data structure displayed as points in the three-dimensional graph corresponding to their respective set of coordinates.

2. The system of claim 1, wherein the first machine learning algorithm is a recurrent neural network (RNN).

3. The system of claim 2, wherein the RNN uses Long Short-Term Memories (LSTMs).

4. The system of claim 1, wherein the data structure is a graph.

5. The system of claim 1, wherein the operations further comprise determining how similar a first product in the plurality of products is to a second product in the plurality of products based on a geometric distance between the set of coordinates corresponding to the embedding for the first product and the set of coordinates corresponding to the embedding for the second product, as stored in the data structure.

6. The system of claim 1, wherein the operations further comprise performing a clustering algorithm on the embeddings in the data structure to identify groups of similar products.

7. The system of claim 1, wherein a category for each product in the plurality of products is indicated in the graphical user interface as a color or shading for each point.

8. The system of claim 1, wherein a value for a key performance index (KPI) for each product is indicated in the graphical user interface as a size of the corresponding point.

9. The system of claim 1, wherein the data is obtained from master data.

10. The system of claim 9, wherein a portion of the data is structured as attributes in the master data while another portion of the data is unstructured text; and
wherein the operations further comprise using a second machine-learned model to perform natural language processing on the unstructured text to convert it to structured text.

11. A method comprising:
accessing data regarding a plurality of sample products, the data including four or more attribute types and, for each product in the plurality of sample products, a value for each of the four or more attribute types;
forming a vector for each product in the plurality of sample products, the vector being an array comprising the values for each of the four or more attribute types;
training an embedding machine-learned model using a first machine learning algorithm to produce a trained embedding machine-learned model, the training comprising feeding the vectors for the plurality of sample products into the first machine learning algorithm, the first machine learning algorithm, in response to the feeding, learning an embedding in a three dimensional space for each vector, the embedding representing a set of parameters to apply to an input vector in order to map the input vector to a set of coordinates in the three dimensional space;
accessing data regarding a plurality of products, the data regarding the plurality of products including the four or more attribute types and, for each product in the plurality of products, a value for each of the four or more attribute types;
forming a vector for each product in the plurality of products, the vector being an array comprising the values for each of the four or more attribute types; and;
feeding the vectors for the plurality of products into the trained embedding machine-learned model to obtain an embedding for each product in the plurality of products; and
storing the embedding for each product in a data structure; and
rendering a graphical user interface displaying a three-dimensional graph, with the embeddings for each product in the plurality of products in the data structure displayed as points in the three-dimensional graph corresponding to their respective set of coordinates.

12. The method of claim 11, wherein the first machine learning algorithm is a recurrent neural network (RNN).

13. The method of claim 12, wherein the RNN uses Long Short-Term Memories (LSTMs).

14. The method of claim 11, wherein the data structure is a graph.

15. The method of claim 11, further comprising determining how similar a first product in the plurality of products is to a second product in the plurality of products based on a geometric distance between the set of coordinates corresponding to the embedding for the first product and the set of coordinates corresponding to the embedding for the second product, as stored in the data structure.

16. A non-transitory machine-readable medium storing instructions which, when executed by one or more processors, cause the one or more processors to perform operations comprising:
accessing data regarding a plurality of sample products, the data including four or more attribute types and, for each product in the plurality of sample products, a value for each of the four or more attribute types;
forming a vector for each product in the plurality of sample products, the vector being an array comprising the values for each of the four or more attribute types;
training an embedding machine-learned model using a first machine learning algorithm to produce a trained embedding machine-learned model, the training comprising feeding the vectors for the plurality of sample products into the first machine learning algorithm, the first machine learning algorithm, in response to the feeding, learning an embedding in a three dimensional space for each vector, the embedding representing a set of parameters to apply to an input vector in order to map the input vector to a set of coordinates in the three dimensional space;
accessing data regarding a plurality of products, the data regarding the plurality of products including the four or more attribute types and, for each product in the plurality of products, a value for each of the four or more attribute types;
forming a vector for each product in the plurality of products, the vector being an array comprising the values for each of the four or more attribute types; and;
feeding the vectors for the plurality of products into the trained embedding machine-learned model to obtain an embedding for each product in the plurality of products; and
storing the embedding for each product in a data structure; and
rendering a graphical user interface displaying a three-dimensional graph, with the embeddings for each product in the plurality of products in the data structure displayed as points in the three-dimensional graph corresponding to their respective set of coordinates.

17. The non-transitory machine-readable medium of claim 16, wherein the first machine learning algorithm is a recurrent neural network (RNN).

\* \* \* \* \*